(12) United States Patent
Richardson et al.

(10) Patent No.: US 11,705,771 B2
(45) Date of Patent: *Jul. 18, 2023

(54) ELECTRIC MACHINES HAVING INSULATION FORMED ON LAMINATED STRUCTURES

(71) Applicant: Essex Furukawa Magnet Wire USA LLC, Atlanta, GA (US)

(72) Inventors: Christopher Paul Richardson, Fort Wayne, IN (US); Frederick McFarland, Fort Wayne, IN (US); Daniel M. Saban, South Elgin, IL (US); Allan R. Knerr, Fort Wayne, IN (US)

(73) Assignee: Essex Furukawa Magnet Wire USA LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/398,973

(22) Filed: Aug. 10, 2021

(65) Prior Publication Data

US 2021/0367471 A1 Nov. 25, 2021

Related U.S. Application Data

(63) Continuation-in-part of application No. 17/316,333, filed on May 10, 2021, now Pat. No. 11,352,521, and a continuation-in-part of application No. 17/003,503, filed on Aug. 26, 2020, now Pat. No. 11,004,575, which is a continuation-in-part of application No. 16/403,665, filed on May 6, 2019, now Pat. No. 10,796,820.

(60) Provisional application No. 63/063,703, filed on Aug. 10, 2020.

(51) Int. Cl.
*H02K 3/12* (2006.01)
*H02K 3/34* (2006.01)

(52) U.S. Cl.
CPC ............... *H02K 3/345* (2013.01); *H02K 3/12* (2013.01)

(58) Field of Classification Search
CPC ... H01B 7/02; H01B 7/04; H01B 7/06; H01B 7/0216; H01B 7/2813; H01B 3/305; H01B 3/306
USPC .... 174/110 R–110 N, 120 R, 120 SR, 121 R, 174/121 SR
See application file for complete search history.

(56) References Cited

U.S. PATENT DOCUMENTS

| | | | |
|---|---|---|---|
| 2,809,229 A | 10/1957 | Eckels | |
| 3,554,984 A * | 1/1971 | Edwards et al. | C08G 73/14 528/331 |
| 4,005,056 A | 1/1977 | Dunwald | |
| 4,273,829 A * | 6/1981 | Perreault | H01B 7/0275 174/110 V |
| 4,381,362 A | 4/1983 | Biggs | |

(Continued)

OTHER PUBLICATIONS

Office Action dated Dec. 8, 2022 for U.S. Appl. No. 17/731,350.
Office Action dated Dec. 8, 2022 for U.S. Appl. No. 17/731,357.

*Primary Examiner* — William H. Mayo, III

(57) ABSTRACT

Electric machines, such as motors, may include an armature and a field component, and at least one of the armature or the field component may include a laminated structure having a plurality of slots into which a plurality of conductive elements are positioned. Additionally, a polymeric insulation layer may be formed directly on the laminated structure at least within the plurality of slots.

22 Claims, 7 Drawing Sheets

(56) References Cited

U.S. PATENT DOCUMENTS

| | | | | |
|---|---|---|---|---|
| 4,430,384 A | * | 2/1984 | George | H01B 7/29 |
| | | | | 428/377 |
| 4,447,797 A | * | 5/1984 | Saunders | H01B 3/40 |
| | | | | 174/120 SR |
| 4,537,804 A | * | 8/1985 | Keane | H01B 3/303 |
| | | | | 427/418 |
| 4,597,804 A | | 7/1986 | Imaoka | |
| 4,760,296 A | * | 7/1988 | Johnston | H01B 3/006 |
| | | | | 310/196 |
| 4,935,302 A | * | 6/1990 | Hjortsberg | H01B 3/30 |
| | | | | 174/120 SR |
| 5,654,095 A | * | 8/1997 | Yin | H02K 3/34 |
| | | | | 174/120 SR |
| 6,337,442 B1 | * | 1/2002 | Lienert | H01B 3/308 |
| | | | | 174/120 R |
| 6,352,230 B2 | | 3/2002 | Grossman | |
| 6,437,249 B1 | * | 8/2002 | Higashiura | H01B 3/427 |
| | | | | 174/120 R |
| 7,253,357 B2 | * | 8/2007 | Cipelli | H02K 3/30 |
| | | | | 174/11 OR |
| 2005/0118422 A1 | * | 6/2005 | Cipelli | H01B 3/306 |
| | | | | 428/375 |
| 2008/0289850 A1 | | 11/2008 | Mhetar | |
| 2012/0285724 A1 | * | 11/2012 | Oya | H01B 3/427 |
| | | | | 174/120 C |
| 2015/0243410 A1 | | 8/2015 | Knerr | |
| 2016/0233003 A1 | | 8/2016 | Caudill | |
| 2020/0402684 A1 | | 12/2020 | Tanaka | |

* cited by examiner

ELECTRIC MACHINES HAVING INSULATION FORMED ON LAMINATED STRUCTURES

CROSS-REFERENCE TO RELATED APPLICATIONS

This application is a continuation-in-part of U.S. patent application Ser. No. 17/316,333, filed May 10, 2021 and entitled "Magnet Wire with Corona Resistant Polyamideimide Insulation", which is a continuation-in-part of U.S. patent application Ser. No. 17/003,503, filed Aug. 26, 2020 and entitled "Magnet Wire with Corona Resistant Polyimide Insulation", which is a continuation-in-part of U.S. patent application Ser. No. 16/403,665, filed May 6, 2019 and entitled "Magnet Wire with Corona Resistant Polyimide Insulation", which claims priority to U.S. Provisional Application No. 62/667,649, filed May 7, 2018 and entitled "Corona Resistant Polyimide Magnet Wire Insulation". Additionally, this application claims priority to U.S. Provisional Application No. 63/063,703, filed Aug. 10, 2020 and entitled "Electric Machines Having Insulation Formed on Laminated Structures". The contents of each of these prior matters is incorporated by reference herein in its entirety.

TECHNICAL FIELD

Embodiments of the disclosure relate generally to electric machines and, more particularly, to electric machines that include laminated structures into which conductors or windings are positioned and which have insulation material formed directly on the laminated structures.

BACKGROUND

A wide variety of different types of electric machines, such as rotary motors, linear motors, and/or generators, are in common use. Electric machines typically create torque by the interaction of an armature component in which an alternating current occurs with a field component that generates a magnetic field. Many types of electric machines include conductive windings that carry current and produce heat. The ability to remove and/or effectively manage the generated heat is a large factor in determining the reliability of an electric machine. As one example, a rotary motor may include stator windings that generate heat, and a maximum temperature limit of a stator insulation system may determine the reliability of the stator.

Certain conventional electric machines, particularly those having relatively small geometries, include critical components, such as stator cores, that are insulated by a powder coated epoxy. However, conventional powder coat epoxy materials are only available for temperature ratings up to approximately 180° C. By contrast, the insulation coatings formed on windings or other conductive elements incorporated into an electric machine can be rated for much higher temperatures, such as temperature ratings up to approximately 260° C. As a result, use of conventional powder coats limit the heat capabilities of electric machines, result in additional cooling requirements, and/or result in larger machine geometries to effectuate cooling.

Other electric machines are insulated with thin sheets of high dielectric material (e.g., mylar, etc.) positioned as slot liners within a machine component. For example, a stator can include slots containing thin sheet slot liners into which windings are positioned. However, slot liners can move within an electric machine and result in increased manufacturing and/or assembly work. Additionally, the use of slot liners often results in larger machine geometries and weight. Accordingly, there is an opportunity for improved electric machines having insulation incorporated into stator, rotor, and/or other suitable machine components. In particular, there is an opportunity for improved electric machines that include laminated structures into which conductors or windings are positioned and which have insulation material formed directly on the laminated structure. Further, there is an opportunity for improved electric machines that include insulation material formed directly on laminated structures and in which the insulation material provides enhanced electrical performance that is similar to that of the insulation utilized in association with windings or conductive elements positioned within slots of the laminated structure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
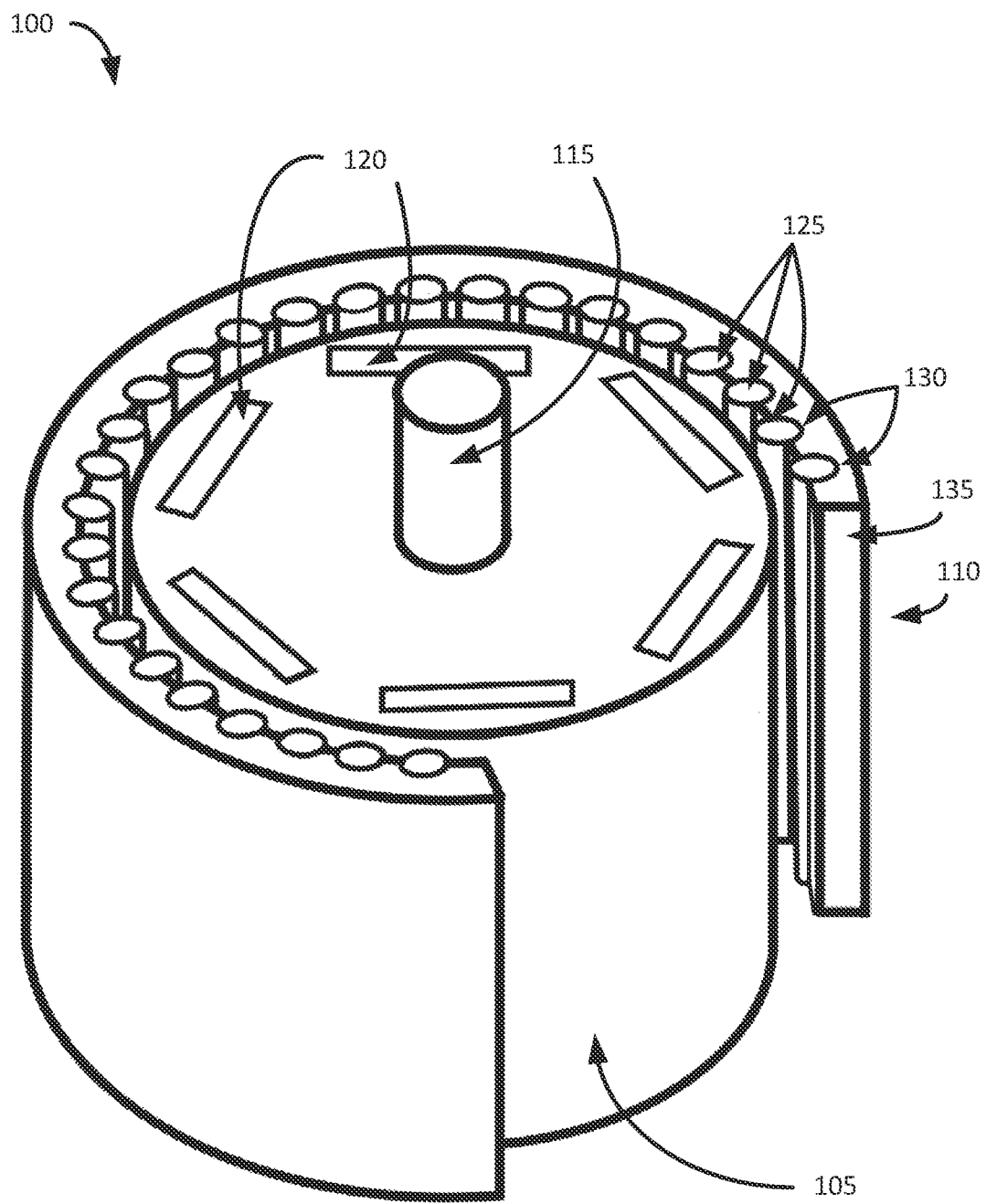
FIGS. 1 and 2 depict perspective views of example electric machines that may incorporate components having insulation formed on laminated structures, according to illustrative embodiments of the disclosure.

Various embodiments of the present disclosure are directed to electric machines that include one or more laminated structures and an insulation layer formed directly on at least one laminated structure. Other embodiments of the present disclosure are directed to methods for forming electric machines that include one or more laminated structures and an insulation layer formed directly on at least one laminated structure. In one example embodiment, an electric machine may include an armature component and a field component that may operate in conjunction with one another to produce torque or another force. For example, the electric machine may be a rotating electric machine in which the armature and field components are embodied as a rotor and a stator. At least one of the armature component and the field component may include a plurality of conductive elements or windings and a laminated structure that includes a plurality of slots into which the plurality of conductive elements are positioned. Additionally, according to an aspect of the disclosure, an insulation layer may be formed directly on the laminated structure at least within the plurality of slots. The insulation layer may be used as an alternative to conventional powder coats and slot liners.

As desired in various embodiments, the insulation layer may be formed on any suitable portion of a laminated structure. In certain embodiments, the insulation layer may be formed only within the slots of the laminated structure. In other embodiments, the insulation layer may be formed on an entire surface of the laminated structure that contains the slots, such as an entire inner surface or an entire outer surface of the laminated structure. In other embodiments the insulation layer may be formed on an entire surface area of the laminated structure. In yet other embodiments, the laminated structure may be formed from a plurality of plates that are arranged in a stack, and the insulation layer may be formed on any suitable portion of the individual plates. For example, the insulation layer may be formed on an entire surface area of each plate (i.e., an entire surface area of each plate prior to the plates being arranged in a stack, etc.), on an entire inner or outer surface of each plate, or within the slots on each plate.

Additionally, the insulation layer may be formed at least partially from or may include a wide variety of suitable materials. Examples of suitable materials include, but are not limited to, polyimide, polyamideimide, polyester, polysulfone, polyphenylsulfone, polysulfide, polyphenylenesulfide, polyetherimide, polyamide, or other suitable thermoset polymeric materials. In certain embodiments, the insulation layer may be formed from or include the same insulating material as that used to form insulation around windings or conductors positioned in the laminated structure slots. For example, both the winding insulation and the insulation layer formed on the laminated structure may be formed from polyimide. As a result of utilizing the same or similar materials that are compatible with one another, more effective heat transfer may be attained within the electric machine.

The insulation layer may also include any suitable number of layers. In certain embodiments, a plurality of layers may be formed from the same materials, such as polyimide. In other embodiments, at least two layers may be formed from different materials. For example, different types of polyimide (or other suitable thermoset materials) may be utilized in a multi-layer structure. As another example, different materials may be utilized in different layers. For example, various layers may be formed from different types of thermoset polymeric materials. As another example, one or more layers of extruded thermoplastic material may be formed over one or more layers of thermoset materials. Indeed, a wide variety of suitable layer constructions may be utilized to form an insulation layer directly on a laminated structure.

Additionally, in certain embodiments, one or more filler materials may be added to the insulation layer (or any number of sublayers included in the insulation layer). For example, an insulation layer may include a base polymeric material (e.g., polyimide, etc.) and one or more filler materials that improve the corona resistance, thermal conductivity, and/or thermal performance (e.g., thermal class, thermal index, thermal endurance, etc.) of the insulation layer may be distributed in the base polymeric material. A wide variety of suitable filler materials may be utilized as desired. In certain embodiments, the filler material may include a blend of at least titanium oxide ($TiO_2$) and silica oxide ($SiO_2$). Filler material may be added to a base polymeric material at any suitable ratio. For example, in certain embodiments, a total amount of filler in a filled insulation layer may be between approximately ten percent (10%) and approximately twenty-five percent (25%) by weight. In other embodiments, a total amount of filler may be approximately 5, 7.5, 10, 12.5, 15, 17.5, 20, 25, 30, 35, 40, 45, or 50 percent by weight, an amount included in a range between any two of the above values, or an amount included in a range bounded on either a minimum or maximum end by one of the above values. Further, a wide variety of blending or mixing ratios may be utilized for various components incorporated into a filler. For example, titanium oxide and silica oxide may be blended at a wide variety of suitable ratios by weight. In various embodiments, a filler may include between approximately twenty percent (20%) and approximately eighty percent (80%) by weight of silica oxide and between approximately twenty percent (20%) and approximately eighty (80%) by weight of titanium oxide. For example, a filler may include 20-40% by weight silica oxide and 60-80% by weight of titanium oxide. A wide variety of other suitable blending ratios may be utilized as desired.

A wide variety of suitable coating methods and/or techniques may be utilized as desired to form an insulation layer on a laminated structure. In various embodiments, insulating material (e.g., thermoset polymeric material, etc.) may be sprayed on the laminated structured, applied via dip coating, applied via spin coating, applied via foam rollers, combinations thereof or otherwise suitably applied. In some cases, one or more utilized application techniques may be selected based upon the flow characteristics of the utilized insulating material(s). The applied insulating material may then be cured via any suitable number of devices, such as enameling ovens, infrared light systems, ultraviolet light systems, electron beam systems, etc. In other embodiments, insulating material (e.g., thermoplastic polymeric material, etc.) may be applied via one or more suitable extrusion devices.

As a result of forming an insulation layer directly on a laminated structure, improved heat transfer may be provided in an electric machine and/or the electric machine may have a higher temperature rating (e.g., thermal class, thermal index, etc.). Additionally, an insulation layer may be provided that is more compatible with the windings or conductors positioned in the slots of the laminated structure, further improving heat transfer. In certain embodiments, the improved heat transfer and/or temperature rating allows the geometry or size of electric machines to be reduced. While size reductions are valuable for all electric machines, they may be particular valuable for electric machines utilized in relatively compact applications, such as unmanned aerial vehicle applications, automotive applications, etc. As desired, an insulation layer may be incorporated into an electric machine to satisfy reliability, size, and/or heat requirements for a given application.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure may be utilized in a wide variety of electric machines including, but not limited to, rotary motors, generators, axial flux machines, linear motors, rotary flux motors, induction motors, asynchronous motors, permanent magnet motors, synchronous reluctance motors, wound field motors, synchronous motors, stepper motors, direct current ("DC") motors, and/or brushless DC motors. In the event that the electric machine is embodied as a rotating electric machine (e.g., a rotary motor, etc.), the electric machine may include a rotor assembly that revolves or rotates in a co-radial relationship and/or a coaxial relationship with a stator assembly. Rotating electric machines may also be formed with either an inrunner design (e.g., rotor component may rotate or revolve inside a stator component) or with an outrunner design (e.g., a rotor component may rotate or revolve around a stator component).

An electric machine may include an armature component and a field component. Regardless of whether an electric machine is an alternating current ("AC") or a direct current ("DC") machine, an armature component or armature may be a component of the electric machine in which an alternating field occurs. For example, the armature may conduct an alternating current. The field component or field may be a component of the electric machine that generates a magnetic field. In various rotating electric machines, the armature may be embodied as either the rotor or the stator. Similarly, the field may be embodied as either the rotor or the stator. In linear motors, the armature and field may be embodied as "unrolled" rotor and stator components. In yet other types of motor, the armature and field may be embodied with suitable constructions that facilitate the generation of alternating and magnetic fields to produce linear torque, linear force, or any other suitable type of work.

As desired in certain embodiments, the armature and the field may include one or more windings or conductive coils positioned within one or more respective slots. In other embodiments, one of the armature or field may include one or more windings or conductive coils positioned within one or more respective slots. For example, one of the armature or field components may include windings while the other component incorporates permanent magnets or other suitable structures that facilitate generation of an electromagnetic field within an electric machine. Regardless of the type of electric machine utilized, the electric machine may be formed with any suitable number of phases (e.g., a single-phase motor, a three-phase motor), any suitable number of poles, any suitable pole pitch, and/or a wide variety of other desired characteristics. One or more windings or conductors incorporated into an electric machine may also be formed in accordance with a wide variety of suitable patterns and/or configurations.

Figure 2:
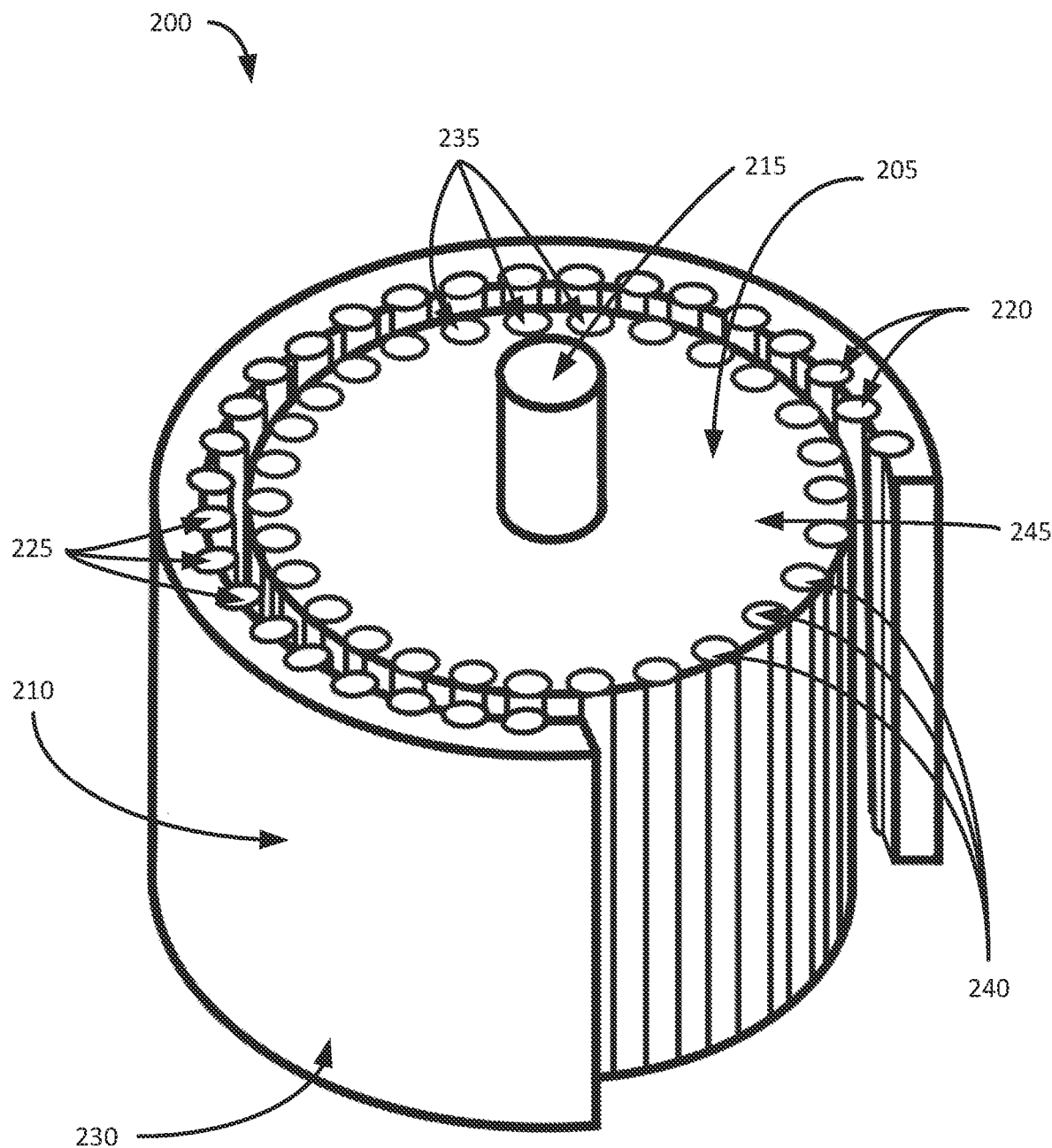

Example rotary motors are described in greater detail below with reference to FIGS. 1 and 2. It will be appreciated that embodiments of the disclosure are equally applicable to other types of electric machines. FIGS. 1 and 2 depict perspective views of example rotary motors 100, 200 that may incorporate insulation layers formed directly on laminated structures, according to illustrative embodiments of the disclosure. Turning first to FIG. 1, an example permanent magnet motor 100 is illustrated. The permanent magnet motor 100 may include a rotor assembly 105 that revolves or rotates within a stator assembly 110 around a suitable shaft 115. In other embodiments, a permanent magnet motor 100 may be formed with an outrunner design, and the rotor assembly 105 may revolve around the stator assembly 110. The rotor assembly may include permanent magnets 120 that interact with the stator assembly 110 in order to create a constant magnetic field. The stator assembly 110 may include windings 125 or other conductive elements that are connected to a power supply in order to produce a rotating magnetic field. The windings 125 of the stator assembly 110 may be positioned within corresponding slots 130 formed by or defined by a laminated structure 135, such as a laminated structure 135 that serves as a stator core. Additionally, an insulation layer may be formed directly on the laminated structure 135 at least within the slots 130.

FIG. 2 illustrates an example induction motor 200 that may include one or more laminated structures on which insulation may be formed. The induction motor 200 may include a rotor assembly 205 that rotates or revolves within a stator assembly 210 around a suitable shaft 215. In other embodiments, the induction motor 200 may be formed with an outrunner design, and the rotor assembly 205 may revolve around the stator assembly 210 via one or more suitable shafts. Regardless of whether the induction motor 200 is formed with an inrunner or outrunner design, the stator assembly 210 may include windings 220 that create a magnetic field when alternating current power is supplied. As desired in various embodiments, the windings 220 of the stator assembly 210 may be positioned within corresponding slots 225 formed by or defined by a laminated structure 230, such as a laminated structure 230 that serves as a stator core. Additionally, in certain embodiments, an insulation layer may be formed directly on the laminated structure 230 at least within the slots 225. The rotor assembly 205 may include windings, bars, rods, or other conductors 235 that interact with the stator assembly 210 to produce electrical torque. For example, the rotor assembly 205 may be formed as a wound-rotor assembly that includes windings connected through slip rings to external resistance. As another example, the rotor assembly 205 may be formed as a squirrel cage rotor assembly that includes bars or conductors embedded in its surface. In certain embodiments, the windings, bars, and/or other conductive elements of the rotor assembly 205 may be positioned within one or more slots 240 defined by a laminated structure 245 utilized in the rotor assembly 205, and, as desired, an insulation layer may be formed on the laminated structure 245 at least within the slots 240. Indeed, in various embodiments, laminated structures and associated insulation layers may be utilized in stator assemblies, rotor assemblies, and/or other suitable components of electric machines.

The motors 100, 200 illustrated in FIGS. 1 and 2 are provided by way of non-limiting example only. A wide variety of other types of motors may be utilized in various embodiments of the disclosure provided that at least one motor component (e.g., a stator assembly or a rotor assembly) incorporates laminated structure on which an insulation layer may be formed. These other motors may include more or less components than those described above with reference to the example motors 100, 200 of FIGS. 1 and 2.

Figure 3:
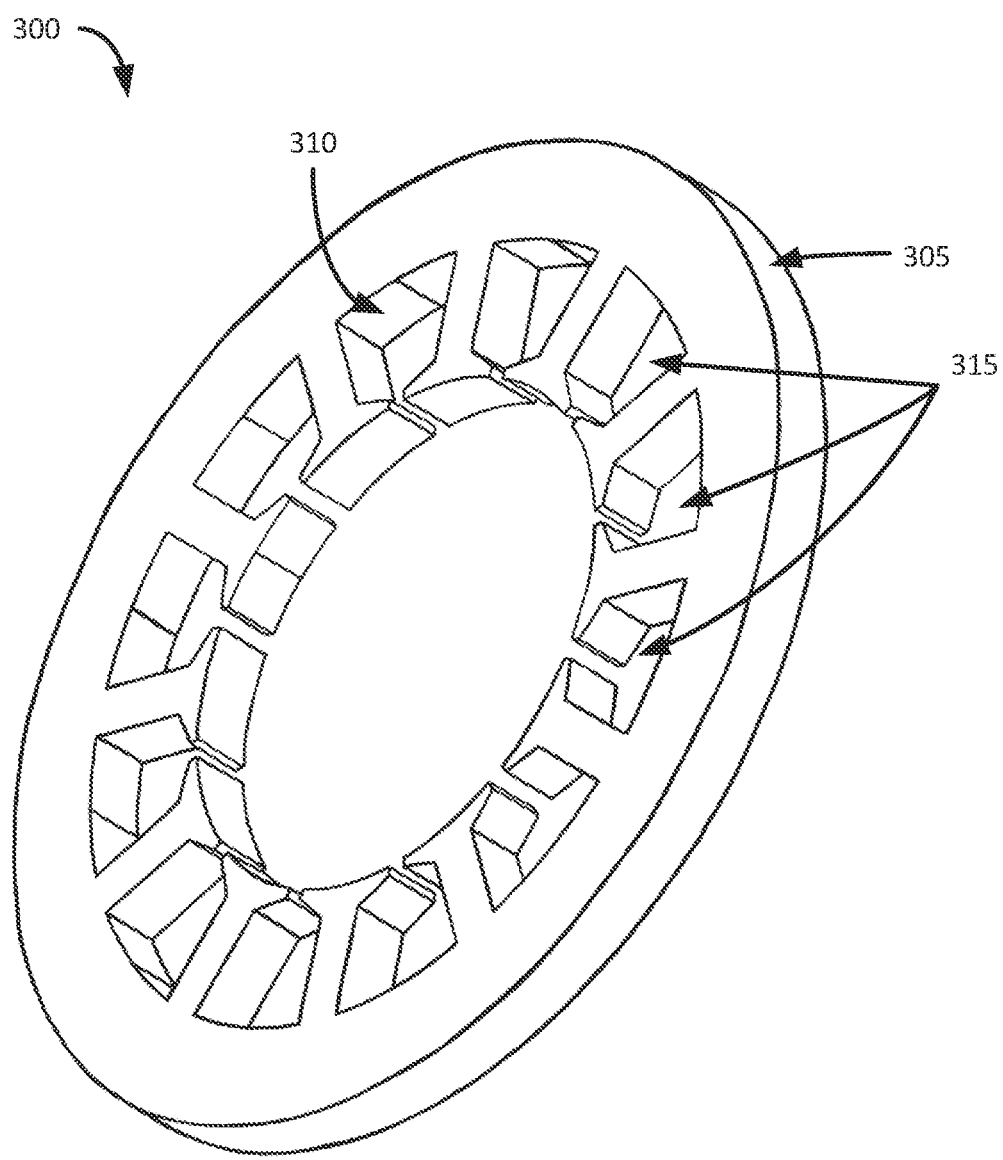
FIGS. 3-4 depict perspective views of example plates that may be incorporated into laminated structures and on which insulation may be formed, according to illustrative embodiments of the disclosure.
Figure 4:
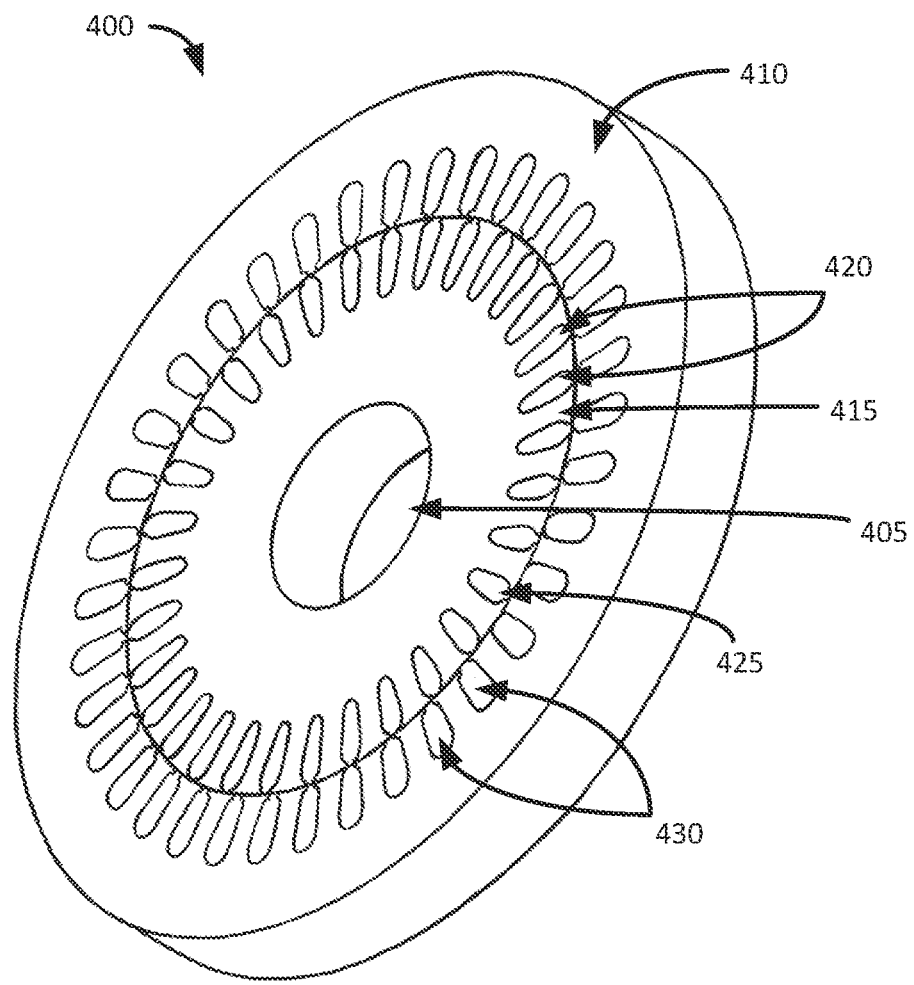
Figure 5:
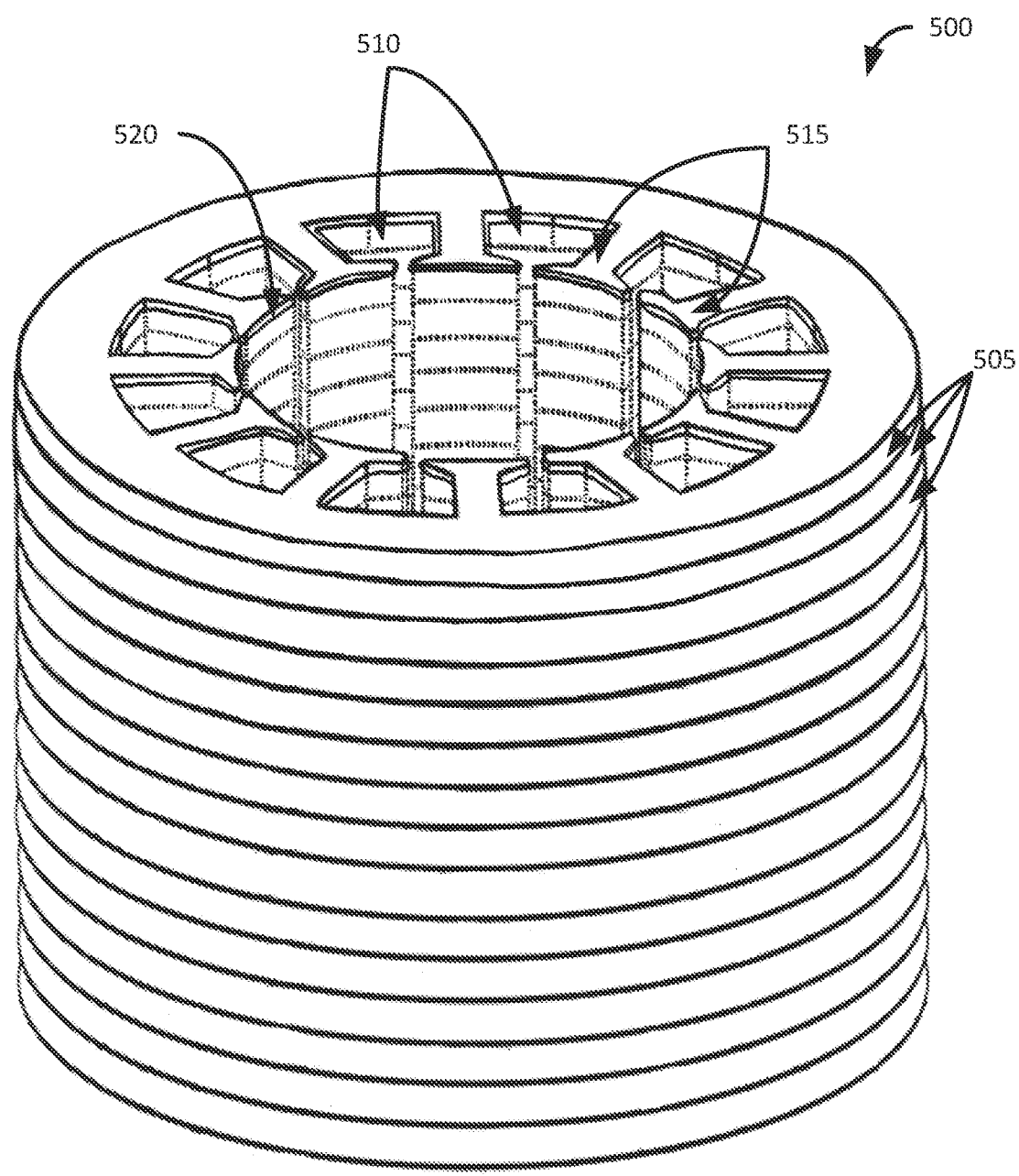
FIG. 5 depicts a perspective view of an example laminated structure on which insulation may be formed, according to an illustrative embodiment of the disclosure.

According to an aspect of the disclosure, an electric machine may include one or more laminated structures, laminated cores, or slot structures into which windings, rods, bars, and/or other conductive elements may be positioned. Additionally, at least one laminated structure incorporated into an electric machine may have an insulation layer or insulation material formed directly on the laminated structure. A laminated structure may include a plurality of slots into which windings or other conductive elements may be positioned. A few non-limiting examples of laminated structures and plates that may be utilized to form laminated structures are illustrated in FIGS. 3-5. In particular, FIG. 3 illustrates a first example plate 300 that may be incorporated into a laminated structure utilized in an external motor assembly (e.g., an external stator assembly, an outrunner rotor assembly etc.). As shown, the plate 300 may have a generally circular cross-sectional shape. The plate may also have an outer or external surface 305 and an inner or internal surface 310. When incorporated into a laminated structure, the internal surface 310 may define a channel or cavity into which an internal motor component (e.g., an internal rotor assembly, an internal stator assembly, etc.) may be positioned. The internal surface 310 may also define a plurality of slots 315 into which windings or other conductive elements may be positioned.

FIG. 4 illustrates an example laminated structure section 400 from a motor assembly that includes both an internal component 405 and an external component 410. In various embodiments, the internal component 405 may be stationary (e.g., a stator, etc.) or may revolve (e.g., an inrunner rotor component, etc.) within the external component 410. Similarly, the external component 410 may be stationary (e.g., a stator, etc.) or may revolve (e.g., an out-runner rotor component, etc.) around the internal component 405. One or both of the internal and external components 405, 410 may be formed as a laminated structure. Thus, one or both components 405, 410 may define a plurality of slots into which windings, bars, or other conductive elements may be positioned. For example, the internal component 405 may have an outer or external surface 415 that defines a plurality of slots 420 into which conductive elements may be positioned. Similarly, the external component 410 may have an inner or internal surface 425 that defines a plurality of slots 430 into which conductive elements may be positioned.

FIG. 5 illustrates an example laminated structure 500 that may be utilized in an external electric machine component (e.g., an external stator in which a rotor revolves, an out-runner rotor, etc.). The laminated structure 500 may be formed from a plurality of sections (e.g., sections of electrical steel, etc.) or plates 505 that are stacked on one another. For example, in a rotary machine, plates may be stacked along a longitudinal direction of the machine (e.g., a direction that is parallel to or aligned with an axis around which the rotor assembly revolves). Any suitable plates 505 may be utilized, such as the example plate 300 illustrated in FIG. 3. Additionally, any number of plates 505 may be utilized to form a laminated structure 500, and each plate 505 may have any suitable thickness. According to an aspect of the disclosure, the laminated structure 500 and/or one or more of the plates 505 may include an insulation layer 520 formed directly on one or more surfaces (e.g., an internal surface, an outer surface, an entire outer periphery, within a plurality of slots, etc.). Certain insulation layers and/or other coatings may increase electrical resistance between laminations or sections, reduce eddy currents, and/or to provide resistance to corrosion or rust.

In other embodiments, a laminated structure 500 may be formed as a single structure. Although plates are illustrated in FIGS. 3-5, a laminated structure 500 may be formed as a unitary component that does not include separate stacked plates. In yet other embodiments, a laminated structure 500 may be formed as a foldable or rollable structure. In this regard, a laminated structure 500 may be folded or rolled up with a flexible PCB that includes windings or conductive components formed thereon. Regardless of the construction utilized to form a laminated structure 500 (e.g., a single structure, a plurality of plates, etc.), the laminated structure 500 (or each plate) may be formed from a wide variety of suitable materials and/or combinations of materials. In certain embodiments, a laminated structure 500 may be formed from electrical steel, lamination steel, silicon electrical steel, or silicon steel. Electrical steel may be tailored to produce specific properties within a motor component (e.g., a stator assembly, a rotor assembly, etc.), such as a small hysteresis area resulting in low power loss per cycle, low core loss, and/or high permeability.

Further, as shown in FIG. 5, a laminated structure 500 may include a plurality of slots 510 into which windings and/or other conductive elements may be positioned. For example, as shown in FIGS. 3 and 5, a laminated structure 500 may include a plurality of slots 510 positioned along or proximate to an inner periphery or internal surface of the laminated structure 500 that defines an internal channel into which another motor component is positioned. The slots 510 may be separated and/or defined by teeth 515 that extend outwardly from the remainder of the laminated structure 500. As another example, as shown in FIG. 4, a laminated structure may include a plurality of slots positioned along or proximate to an outer periphery or external surface of the laminated structure and defined by corresponding teeth. Each slot (generally referred to as slot 510) may be configured to receive a suitable wire, winding, or other conductive element. In certain embodiments, each slot 510 may extend along or parallel to a longitudinal direction of a motor. In other embodiments, one or more slots 510 may be formed at one or more desired angles relative to the longitudinal direction. Any number of slots 510 may be formed in a laminated structure 500 as desired in various embodiments. In certain embodiments, a number of slots 510 and corresponding conductive elements may be based upon desired motor characteristics, such as a desired pole pitch and/or winding configuration.

The laminated structures and plates illustrated in FIGS. 3-5 are provided by way of non-limiting example only. A wide variety of other types of laminated structures or laminated cores may be utilized in various embodiments of the disclosure. These other laminated structures may include more or less components than those described above and/or illustrated with reference to the example structures and plates of FIGS. 3-5.

According to an aspect of the disclosure, a respective insulation layer may be formed directly on one or more laminated structures incorporated into an electric machine. For example, an insulation layer 520 may be formed on the laminated structure 500 of FIG. 5. The insulation layer may be used as an alternative to conventional powder coats and slot liners. The insulation layer may be more compatible with the windings positioned into slots of the laminated structure than conventional powder coats and slot lines, thereby improving thermal performance of the electric machine. Additionally, the insulation layer may provide enhanced electrical and/or thermal performance relative to conventional insulating techniques, thereby facilitating higher operating temperatures for an electric machine, smaller machine geometries, and/or efficiency gains within the electric machine.

As desired in various embodiments, the insulation layer (generally referred to for ease of understanding as insulation later 520) may be formed on any suitable portion of a laminated structure, such as the laminated structure 500 of FIG. 5. In certain embodiments, the insulation layer 520 may be formed within the slots 510 of the laminated structure 500. For example, the insulation layer 520 may be selectively formed on the laminated structure 500 within the slots 510. In other embodiments, the insulation layer 520 may be formed on an entire surface of the laminated structure 500 that contains the slots 510. For example, if the slots 515 are formed on an inner surface of the laminated structure 500, then the insulation layer 520 may be formed on the entire inner surface. As another example, if the slots 515 are formed on an outer surface of the laminated structure 500, then the insulation layer 520 may be formed on the entire outer surface. In other embodiments, the insulation layer 520 may be formed on an entire surface area or outer periphery of the laminated structure 500.

In certain embodiments in which the laminated structure 500 is formed from a plurality of plates 505, the insulation layer 520 may be formed after the plurality of plates 505 have been arranged in a stack or other desired configuration. In other embodiments, respective insulation layers may be formed on all or a desired portion of the plates 505 prior to the plates 505 being arranged into a stack. For example, the insulation layer 520 may be formed within the slots on each plate 505. As another example, the insulation layer 520 may be formed on an entire inner or outer surface of each plate 505. As yet another example, the insulation layer 520 may be formed on an entire surface area of each plate 505. In this regard, insulation material may be present between adjacent plates, and the insulation material may increase electrical resistance between plates, reduce eddy currents, and/or to provide resistance to corrosion or rust. Alternatively, the insulation layer 520 may be formed on top and/or bottom surfaces of the plates 505 (i.e., such that it is present between adjacent plates) and on only a portion of the remainder of the outer periphery of the plates 505 (e.g., an entire inner or outer surface, within the slots, etc.).

In certain embodiments, the insulation layer 520 or insulation coating may be formed directly on the laminated structure 500. In other words, the insulation layer 520 may be formed on a surface of the laminated structure 500 without any intermediary layers. In other embodiments, one or more base layers may be formed directly on the laminated structure 500, and the insulation layer 520 may be formed on the one or more base layers. For example, a layer that promotes adhesion between the laminated structure 500 and the insulation layer 520 may be formed on the laminated structure 520, and the insulation layer 520 may be formed on the base adhesive layer. Alternatively, an adhesion-promoting layer may be incorporated as a sublayer into the insulation layer 520. Additionally, in certain embodiments, the insulation layer 520 may be permanently affixed to the laminated structure 500. Accordingly, laminated structures and electric machines that incorporate insulation layers in accordance with embodiments of this disclosure may be formed without the use of powder coats and slot liners.

A wide variety of suitable materials and/or combinations of materials may be utilized as desired to form the insulation layer 520 and/or various sublayers of the insulation layer 520. Examples of suitable materials include, but are not limited to, polyimide ("PI"), polyamideimide ("PAI"), amideimide, polyester, polyesterimide, polysulfone, polyphenylsulfone, polysulfide, polyphenylenesulfide, polyetherimide, polyamide, polyketones, and/or other suitable materials. In certain embodiments, the insulation layer 520 may be formed from or may include one or more suitable thermoset materials. For example, the insulation layer 520 may be formed from thermoset polyimide. Thermoset materials are materials that are irreversibly hardened by curing from a prepolymer or resin. As a result, thermoset materials may be applied to a laminated structure 500 as a varnish containing resin dissolved within solvent, and the varnish may be cured in order to form a polymeric insulation layer. This process may be repeated until a desired insulation thickness has been attained.

In certain embodiments, the insulation layer 520 may be formed from or include the same insulating material as that used to form insulation around windings or conductors positioned in the slots 510 of the laminated structure 500. For example, both the winding insulation and the insulation layer 520 formed on the laminated structure 500 may be formed from polyimide. In other embodiments, the insulation layer 520 may be formed from one or more materials that are compatible with or specifically selected to be utilized in conjunction with the winding insulation in order to achieve a desired temperature rating and/or heat transfer. Other materials and/or combinations of materials may be utilized as desired. As a result of utilizing the same or similar materials that are compatible with one another, more effective heat transfer may be attained within an electric machine. In certain embodiments, the thermal rating, thermal classification, and/or the thermal endurance of the electric machine may also be improved. In many conventional systems, the magnet wire (or other conductors) utilized to form windings may have a higher thermal rating than the stator core (or other electric machine component) into which the windings are positioned, thereby limiting the overall thermal rating of the electric machine. As a result of improving the thermal rating, index, or endurance of the laminated structure 500, the electric machine may operate at a higher temperature, which may provide operational efficiency gains, improve output, and/or allow the machine to be constructed with a smaller geometry.

The insulation layer 520 may also include any suitable number of layers or sublayers. In various embodiments, the insulation layer 520 may be formed from a single layer of material or, alternatively, the insulation layer 520 may include a plurality of layers or sublayers. In certain embodiments, a plurality of layers may be formed from the same material or from a combination of materials. For example, the insulation layer 520 may include a plurality of layers of polyimide or a plurality of layers of a thermoset material. In other embodiments, at least two layers or sublayers of the insulation layer 520 may be formed from different materials. For example, different types of polyimide (or other suitable thermoset materials) may be utilized in a multi-layer structure. As another example, a polyimide layer may be formed on an adhesive-promoting layer. In certain embodiments, the insulation layer 520 may include a first PI layer that promotes enhanced adhesion to the laminated structure 500 and at least a second PI layer formed over the first PI layer and having a different formulation to provide enhanced electrical and/or thermal performance. For example, a first PI layer may include PI formed by reacting a dianhydride component (e.g., pyromellitic dianhydride or PMDA) with a diamine component that contains 2,2-bis[4-(4-aminophenoxy)phenyl] propane ("BAPP"). A second PI layer may then include PI formed by reacting a dianhydride component with 4,4'-oxydianiline ("ODA"). In various embodiments, at least two different layers may include different grades of the same material, different formulations of the same or similar materials, and/or different additives or fillers incorporated into the same or similar base materials or resins. In one non-limiting example, the insulation layer 520 may include at least three polyimide ("PI") layers. An inner or first PI layer may be formed with a PI having relatively high adhesion properties such that the inner layer will adhere to the laminated structure 500. For example, the first PI layer may include an adhesion promotor, such as melamine or its various derivatives (e.g., Cymel®, etc.) mixed with a PI resin, or the PI may be formulated from one or more ingredients (e.g., BAPP reacted with a suitable dianhydride component) that facilitate greater adhesion. A second PI layer may be formed from a PI resin that provides for relatively high dielectric strength. A third PI layer may then be formed to have relatively high temperature resistance and/or anti-corrosion resistance. A wide variety of suitable filler materials may be added to one or more of the PI layers as desired. Additionally, any number of PI layers may be utilized. Indeed, a wide variety of suitable layer combinations may be formed as desired. In other example embodiments, different materials may be utilized in different layers. For example, various layers incorporated into the insulation layer 520 may be formed from different types of thermoset polymeric materials. For example, a first layer may be formed from PI, and a second layer may be formed from polyamideimide ("PAI") or another suitable material. In yet other embodiments, different layers may be formed from different types of materials. For example, at least one layer may be formed from a thermoset material (e.g., PI, PAI, etc.), such as a thermoset material that is applied as a varnish and cured. A second layer may then be formed from one or more thermoplastic materials, such as thermoplastic materials that are extruded over one or more thermoset materials. Indeed, a wide variety of layer constructions may be utilized in the insulation layer 520. These constructions may include any suitable materials and/or combinations of materials. Additionally, each layer may be formed as an unfilled layer or as a filled layer that includes any suitable filler materials. Further, any suitable number of layers may be incorporated into the insulation layer 520, and each layer may have any suitable thickness. Additionally, in a multi-layer insulation system, any suitable ratios of thicknesses between the layers may be utilized in various embodiments. In certain embodiments, the thicknesses of different layers may be based at least in part upon a desired application for the electric machine and associated performance requirements, such as desired thermal performance, corona resistance, partial discharge performance, etc. As desired, the PI materials and/or other materials incorporated into the insulation layer 520 may be selected based on a wide variety of suitable factors. These factors include, but are not limited to, a type of electric machine in which the insulation layer 520 is utilized, a desired application for a motor or other electric machine (e.g., a vehicular application, an unmanned aerial vehicle application, etc.), one or more coating techniques that are utilized to apply the insulation layer 520, and/or one or more desired performance characteristics for the insulation layer 520 (e.g., temperature rating, dielectric strength, etc.). In certain embodiments, the materials incorporated into the insulation layer 520 may be targeted for use with windings having a localized electric field greater than approximately 3000 V per millimeter. In other embodiments, the materials incorporated into the insulation layer 520 may be targeted for use with windings having a localized electric field greater than approximately 1000 V per millimeter. In yet other embodiments, the materials incorporated into the insulation layer 520 may be targeted for a desired maximum operating temperature or temperature rating (e.g., a temperature of at least 200° C., 220° C., 240° C., 260° C., etc.).

As set forth above, in certain embodiments, the insulation layer 520 may be formed from one or more thermoset materials. In other embodiments, the insulation layer 520 may be formed from one or more thermoplastic materials, such as extruded thermoplastic materials. In yet other embodiments, the insulation layer 520 may include a combination of thermoset and thermoplastic materials. For example, extruded thermoplastic material may be formed over thermoset materials. Examples of suitable thermoplastic materials that may be utilized include, but are not limited to, polyetheretherketone ("PEEK"), polyetherketoneketone ("PEKK"), polyetheretherketoneketone ("PEEKK"), polyetherketone ("PEK"), polyaryletherketone ("PAEK"), other suitable polymers that include at least one ketone group, polyetherimide ("PEI") such as Ultem® marketed by Sabic Global Technologies, polyphenylsulfone ("PPSU") such as Radel® marketed by Solvay Specialty Polymers USA, polyethersulfone ("PESU"), polypheylene sulfide ("PPS"), polybenzimidazole ("PBI"), polycarbonate, one or more polyesters (e.g., polyethylene terephthalate ("PET"), etc.), one or more copolyesters, polyamide, and/or thermoplastic polyimide ("TPI"). In yet other embodiments, the insulation layer 520 may be formed from or may include one or more sublayers formed from semi-conductive materials (e.g., semi-conductive thermoset materials, etc.), conformal materials (e.g., parylene, etc.), and/or other suitable materials. For example, one or more conformal layers may be formed as outer layers via vapor deposition.

Additionally, each layer or sublayer of the insulation layer 520 may be formed with any desired thickness, such as a thickness of approximately 0.0002, 0.0005, 0.007, 0.001, 0.002, 0.003, 0.004, 0.005, 0.006, 0.007, 0.008, 0.009, 0.010, 0.012, 0.015, 0.017, or 0.020 inches, a thickness included in a range between any two of the aforementioned values, and/or a thickness included in a range bounded on either a minimum or maximum end by one of the aforementioned values. Regardless of the number of sublayers incorporated into the insulation layer 520, the insulation layer 520 may also be formed with any suitable total thickness. For example, the insulation layer 520 may be formed with a total thickness of approximately 0.0002, 0.0005, 0.007, 0.001, 0.002, 0.003, 0.004, 0.005, 0.006, 0.007, 0.008, 0.009, 0.010, 0.012, 0.015, 0.017, 0.020, 0.025, 0.040, 0.050, 0.070, 0.075, 0.080, 0.090, or 0.10 inches, a thickness included in a range between any two of the aforementioned values, and/or a thickness included in a range bounded on either a minimum or maximum end by one of the aforementioned values.

As desired in various embodiments, one or more additives may be incorporated into a polymeric material utilized in the insulation layer 520. These additives may include compatabilizers, adhesion promoters, and/or one or more suitable filler materials. An additive may serve a wide variety of suitable purposes, such as promotion of adhesion between various sublayers of the insulation layer 520 and/or between the insulation layer 520 and the laminated structure 500, enhancing moisture resistance, and/or promoting higher temperature stability. In certain embodiments, an additive may be formed from or may include a material that is formed by reacting an amine moiety with an aldehyde material (e.g., a glyoxal material, a formaldehyde material, etc.). For example, a Cymel material or resin, such as Cymel materials manufactured and marketed by Allnex, may be utilized as an additive in conjunction with PI. In other embodiments, a formaldehyde-free additive may be utilized. A suitable Cymel material or other additive may be utilized to facilitate greater adhesion between a PI layer and an underlying layer (e.g., the laminated structure, an underlying layer of thermoset material, etc.), to bind the base PI polymeric material to one or more filler materials, etc. Other types of Cymel materials, crosslinking materials, and/or other additives may be utilized as desired.

In other embodiments, one or more suitable surface modification treatments may be utilized on a laminated structure 500 and/or any number of layers or sublayers of the insulation layer 520 to promote adhesion with a subsequently formed layer of material. Examples of suitable surface modification treatments include, but are not limited to, a plasma treatment, an ultraviolet ("UV") treatment, a corona discharge treatment, and/or a gas flame treatment. A surface treatment may alter a topography of a laminated structure 500 or insulating layer and/or form functional groups on the surface of the laminated structure 500 or insulating layer that enhances or promotes bonding of a subsequently formed insulating layer. In certain embodiments, the altered topography may also enhance or improve the wettability of a varnish utilized to form a subsequent layer of thermosetting material by altering a surface tension of the treated layer. As a result, surface treatments may reduce interlayer delamination.

Examples of suitable filler materials include, but are not limited to, inorganic materials such as metals, transition metals, lanthanides, actinides, metal oxides, and/or hydrated oxides of suitable materials such as aluminum, tin, boron, germanium, gallium, lead, silicon, titanium, chromium, zinc, yttrium, vanadium, zirconium, nickel, etc.; suitable organic materials such as polyaniline, polyacetylene, polyphenylene, polypyrrole, other electrically conductive particles; and/or any suitable combination of materials. For example, titanium dioxide, silicon dioxide, chromium dioxide, and/or suitable combinations thereof may be used as filler materials. In certain embodiments, the filler material(s) may enhance corona resistance and/or one or more thermal properties (e.g., temperature resistance, cut-through resistance, heat shock, etc.). The particles of a filler material may have any suitable dimensions, such as any suitable diameters. In certain embodiments, a filler material may include nanoparticles. Further, any suitable blend or mixture ratio between filler material and polymeric base materials may be utilized.

In certain embodiments, one or more PI layers (or layers formed from other materials) utilized in an insulation layer 520 may include a suitable filler. Additionally, the filler may include a blend of at least titanium dioxide ($TiO_2$) and silica dioxide ($SiO_2$). A blend of titanium dioxide and silica dioxide may additionally include other suitable materials as desired, such as chromium dioxide ($CrO_2$). In other embodiments, the filler may include a blend of at least chromium dioxide and silica dioxide. It should be noted, however, that while a chromium dioxide/silica dioxide blend was found to provide enhanced performance relative to unfilled PI, it may not perform as well as a titanium dioxide/silica dioxide blend. The addition of the filler may improve the corona resistance and/or thermal life of a layer formed from filled PI on a laminated structure 500.

In certain embodiments, the addition of the filler may also improve the thermal conductivity of a laminated structure 500 and permit improved thermal heat transfer. Indeed, one or more filled insulation layers (e.g., filled PI insulation layers, etc.) may function to conduct or draw heat away from the laminated structure 500 and/or magnet wire or other conductors positioned within slots 510 of the laminated structure 500. As a result, the laminated structure 500 and/or electric machine may operate at a relatively lower temperature than conventional laminated structures and/or electric machines that do not include filled insulation layers. This improved thermal conductivity may facilitate operation of electric machines at higher voltages, thereby improving output. In various embodiments, a filled PI insulation layer may have a thermal conductivity that is at least 1.5, 2, 3, or 4 times that of an unfilled PI insulation layer having a similar thickness. In other words, a filled PI insulation layer may have a first thermal conductivity that is at least 1.5, 2, 3, or 4 times that of a second thermal conductivity for the base PI material into which filler is added.

Filler material may be added to PI (or another suitable base material) at any suitable ratio. For example, in certain embodiments, a total amount of filler in a filled layer may be between approximately ten percent (10%) and approximately twenty-five percent (25%) by weight. In other embodiments, a total amount of filler may be between approximately fifteen percent (15%) and approximately twenty percent (20%) by weight. In various other embodiments, a total amount of filler may be approximately 5, 7.5, 10, 12.5, 15, 17, 17.5, 20, 25, 30, 35, 40, 45, or 50 percent by weight, an amount included in a range between any two of the above values, or an amount included in a range bounded on either a minimum or maximum end by one of the above values.

A wide variety of blending or mixing ratios may be utilized for various components incorporated into a filler. For example, titanium dioxide and silica dioxide may be blended at a wide variety of suitable ratios by weight. In various embodiments, a filler may include between approximately twenty percent (20%) and approximately eighty percent (80%) by weight of silica dioxide and between approximately twenty percent (20%) and approximately eighty (80%) by weight of titanium dioxide. For example, a filler may include approximately 20, 25, 30, 33, 35, 40, 45, 50, 55, 60, 65, 67, 70, 75, or 80 percent by weight of silica dioxide, a weight percentage included in a range between any two of the above values (e.g., between 20% and 40%, etc.), or a weight percentage included in a range bounded on either a minimum or maximum end by one of the above values (e.g., at least 20%, etc.). Similarly, a filler may include approximately 20, 25, 30, 33, 35, 40, 45, 50, 55, 60, 65, 67, 70, 75, or 80 percent by weight of titanium dioxide, a weight percentage included in a range between any two of the above values (e.g., between 20% and 40%, etc.), or a weight percentage included in a range bounded on either a minimum or maximum end by one of the above values (e.g., at least 20%, etc.). As desired a ratio of a first component (e.g., titanium dioxide) to a second component (e.g., silica dioxide) may be approximately 80/20, 75/25, 70/30, 67/33, 65/35, 60/40, 55/45, 50/50, 45/55, 40/60, 35/65, 33/67, 30/70, 25/75, 20/80, or any other suitable ratio.

As one example, titanium dioxide and silica dioxide may be blended at approximately a 75/25 ratio by weight. In other words, the filler may include approximately 75% titanium dioxide and approximately 25% silica dioxide by weight. In the event that a PI layer (or layer formed from another suitable material) includes approximately 15.0% by weight of filler, then the PI layer may include approximately 11.25% by weight of titanium dioxide and approximately 3.75% by weight of silica dioxide. A wide variety of other filler ratios (e.g., ratio of filler within an insulating layer) and/or blending ratios (e.g., ratios of components utilized to make a filler) may be utilized as desired. For example, titanium dioxide and silica dioxide may be blended at approximately a 60/50 ratio by weight. The examples above are not intended to be limiting.

Additionally, in certain embodiments, the components utilized in a filler may be selected based upon one or more desired properties. For example, a first filler component (e.g., titanium dioxide, etc.) may be selected as an inorganic oxide having a relatively low resistivity and a second filler component (e.g., silica dioxide, etc.) may be selected as an inorganic oxide having a relatively large surface area. The mixture may then be added to a base resin material (e.g., PI, etc.) prior to formation of an insulating layer. In other words, a filled layer may include a mixture of a large surface area inorganic oxide and a low resistivity inorganic oxide. A large surface area inorganic oxide is believed to permit more energy to penetrate through the insulation, thereby reducing the degradation of the insulation caused by high voltage and high frequency wave shapes in electrical devices.

The components of a filler may include any suitable particle sizes, surface areas, and/or other dimensions. For example, a filler component may have a nominal particle size that is less than approximately one micron. In certain embodiments, a filler component may include nanoparticles. Additionally, a wide variety of suitable methods and/or techniques may be utilized to add a filler to a base polymeric material (e.g., PI, etc.). In certain embodiments, a filler may be ball-milled or otherwise ground or milled in order to reduce agglomerates to below a desired amount, such as a Hegman gauge or grind of eight "eight" or finer. These are generally made at a higher concentration and can be reduced in the final "letdown" of the end formulation. As desired, the filler may be milled or ground until that particle size is below approximately 1.0 microns. Other particle sizes may be attained as desired. The filler may be incorporated into either a base polymeric resin or, alternatively, into another resin to form a concentrated "paste" that will later be added to the base polymeric resin to produce a final formulation.

In the event that a multi-layer insulation system includes a filled PI layer combined with one or more additional layers, a wide variety of benefits may be provided. In certain embodiments, incorporation of a filled PI layer may improve the thermal performance, corona discharge performance, and/or the partial discharge performance of an insulation system; however, the combination of additional layers (i.e., non-filled PI layer(s)) may lower or reduce an overall cost of the insulation system relative to a system that includes all filled PI or higher cost materials. In other words, a sufficient amount of filled PI may be included to attain desired performance while lower cost materials may be utilized to achieve a desired overall insulation build or thickness and/or to promote other desired parameters.

A wide variety of suitable methods and/or techniques may be utilized as desired to form an insulation layer 520 on a laminated structure 500. In certain embodiments, an insulation layer 520 (or a sublayer of the insulation layer 520) may be formed via spray coating. For example, a polymeric resin suspended in a varnish may be selectively sprayed on a portion (i.e., within the slots 510) or all of one or more surfaces of the laminated structure 500. As another example, insulation material may be thermal spray coated onto a laminated structure 500. Any suitable number and/or types of spraying devices may be utilized. As desired, the sprayed insulation material may be cured following application.

In other embodiments, an insulation layer 520 (or a sublayer of the insulation layer 520) may be formed via dip coating. For example, a laminated structure 500 or any number of plates 505 may be dipped into a varnish. The applied insulation material may then be cured as desired. In yet other embodiments, insulation material may be applied or selectively applied to a laminated structure 500 or any number of plates 505 via spin coating. Any suitable number of spin coating devices or spinners may be utilized to apply insulation material. The applied insulation material may then be cured as desired. In yet other embodiments, any suitable number of rollers (e.g., foam rollers, etc.), brushes, and/or other suitable devices may be utilized to apply insulation material to a laminated structure 500 or any desired number of plates 505. The applied insulation material than then be cured as desired. In the event that applied insulating material is cured following application on a laminated structure, a wide variety of suitable curing devices may be utilized. Examples of suitable curing devices include, but are not limited to, ovens or heat curing devices, infrared light systems, ultraviolet light systems, electron beam systems, etc. In yet other embodiments, one or more suitable extrusion devices (e.g., extrusion heads, etc.) may be utilized to extrude insulation material onto a laminated structure 500 or any number of plates 505. In yet other embodiments, a combination of different techniques may be utilized to apply an insulation layer 520 (or a plurality of sublayers of the insulation layer 520) onto a laminated structure 500.

As a result of forming an insulation layer 520 directly on a laminated structure 500, improved heat transfer may be provided in an electric machine. Additionally, an insulation layer 520 may be provided that is more compatible with the windings or conductors positioned in the slots of the laminated structure 500 relative to conventional insulation techniques, further improving heat transfer. In particular, in certain embodiments, an insulation layer 520 may be formed from or include the same or similar materials as those utilized on the windings or conductors. In other embodiments, an insulation layer 520 may be formed from materials that are compatible with those used on the windings in order to achieve desired heat transfer, temperature rating, and/or other desirable performance characteristics within an electric machine. As desired, an insulation layer may be incorporated into an electric machine to satisfy reliability, size, and/or heat requirements for a given application.

In certain embodiments, formation of an insulation layer 520 that includes one or more filled layers (e.g., one or more filled PI layers, etc.) may provide a thermal class, a thermal index, or a thermal endurance of at least approximately, 200, 220, 240, 260, or 265° C. A thermal index is generally defined as a number in degrees Celsius that compares the temperature vs. time characteristics of an electrical insulation material. It may be obtained by extrapolating the Arrhenius plot of life versus temperature to a specified time, usually 20,000 hours. In recent years, the thermal classifications or thermal index of magnet wire incorporated into motors has increased due to the use of improved materials and/or manufacturing techniques; however, the operating temperature of an electric machine (e.g., a motor) has been limited due to the conventional powder coats and slot liners utilized. As a result of forming an insulation layer 520 directly on a laminated structure within an electric machine, it is possible to enhance the thermal endurance, thermal index, thermal class, or temperature rating of the laminated structure 500 and the electric machine. The improved heat transfer and/or temperature rating afforded by the insulation layer 520 may contribute to enhanced efficiency within an electric machine. In certain embodiments, the incorporation of an insulation layer 520 into at least the slots of a laminated structure 500 may result in an efficiency gain of at least 3, 5, 7, 8, 10, 12, or 15 percent, or an efficiency gain included in a range between any two of the above values. For example, incorporation of an insulation layer 520 may result in an efficiency gain of at least 12% by limiting the resistive losses in an electric machine. The enhanced efficiency may permit the electric machine to be operating at higher speeds and/or outputs, operate at higher temperatures, and/or may allow the geometry or size of the electric machine to be reduced. While size reductions are valuable for all electric machines, they may be particular valuable for electric machines utilized in compact applications, such as unmanned aerial vehicle applications.

By contrast, prior art powder coating techniques are only available with temperature ratings that are much lower than those of winding wire insulation. For example, powder coats are available with the temperature ratings up to 180° C. while winding wire enamel can be rated as high as 260° C. These powder coats are typically used in relatively small electric machines, such as drone motors, and the use of powder coats may lead to inefficiencies. Additionally, it is difficult to incorporate strips of material or slot liners into relatively small electric machines. The slot liners may also move or shift within an electric machine, thereby limiting or negating their efficacy.

Figure 6:
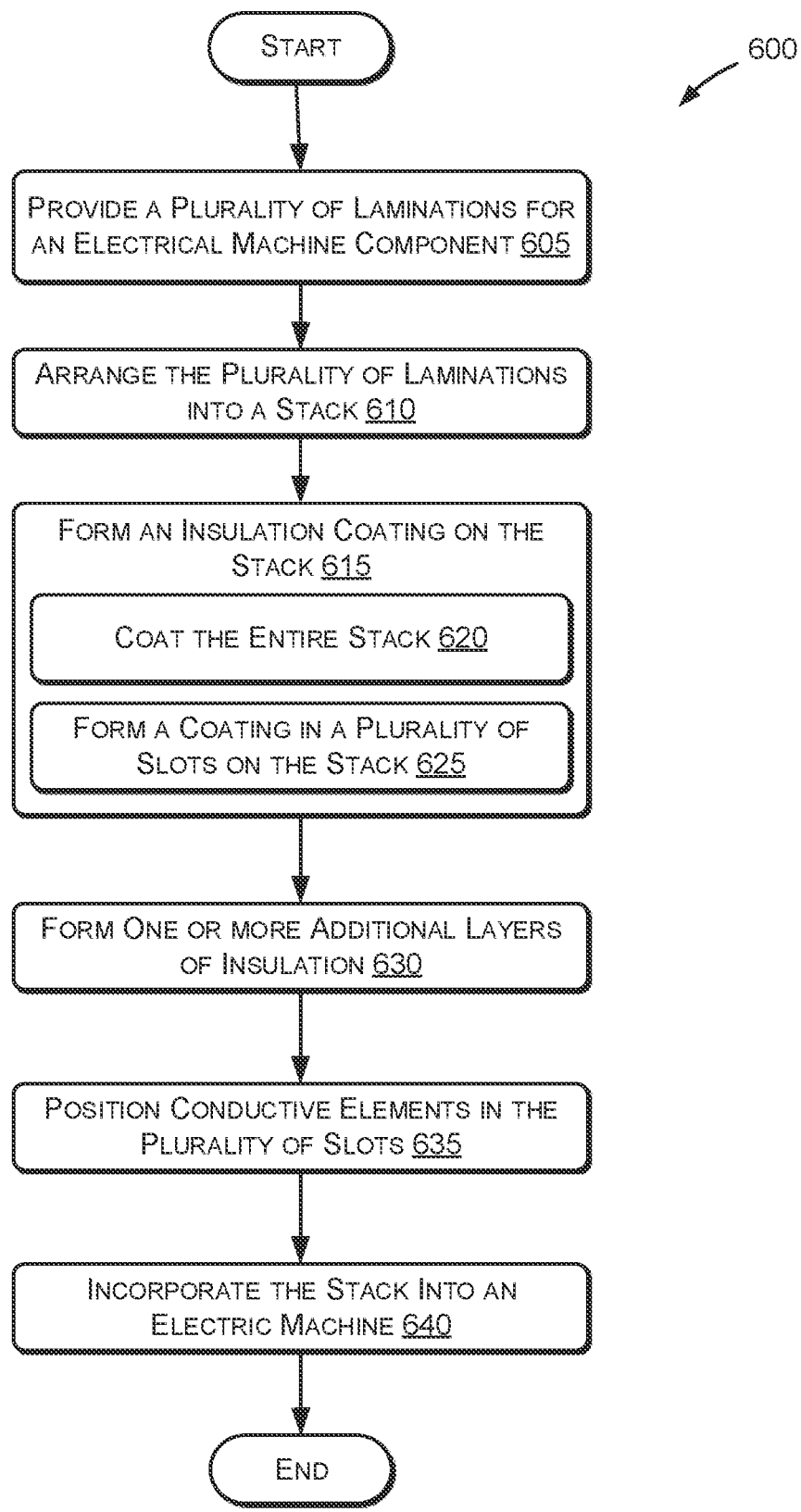
FIGS. 6 and 7 depict flow charts of example methods for forming electric machines that include insulation formed on one or more laminated structures, according to illustrative embodiments of the disclosure.
Figure 7:
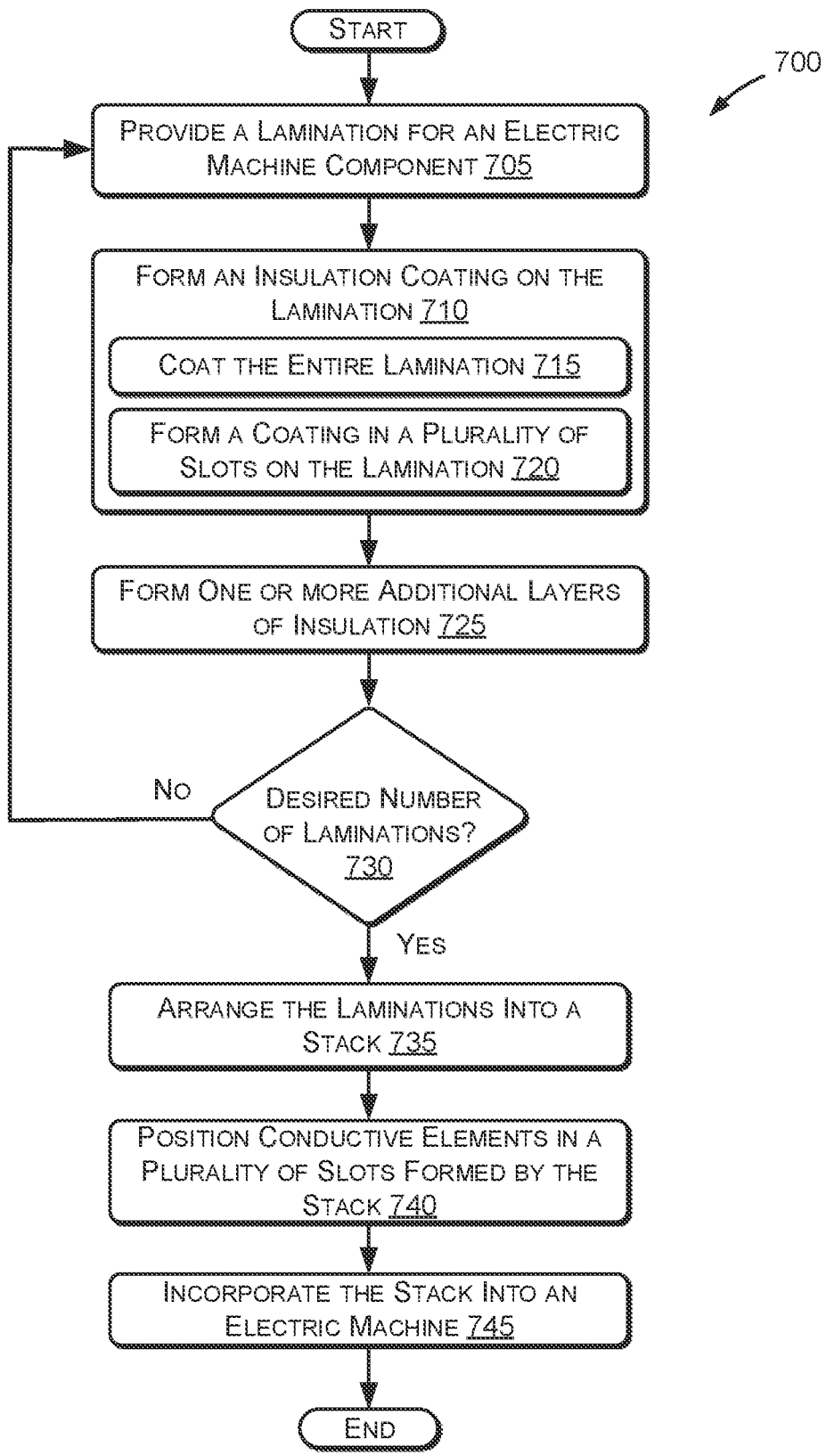

FIGS. 6 and 7 depict flow charts of example methods 600, 700 for forming electric machines that include insulation layers formed on laminated structures. FIG. 6 describes a method in which an insulation layer or coating is formed on a complete laminated structure, such as laminated structure formed by arranging a plurality of plates or laminations into a stack. FIG. 7 describes a method in which a respective insulation layer or coating is formed on a plurality of plates or laminations prior to the plates being arranged into a stack.

With reference to FIG. 6, the example method 600 may begin at block 605. At block 605, a plurality of laminations or plates for an electrical machine component may be provided. For example, a plurality of plates utilized to form a laminated structure for a stator, rotor, field, or armature component may be provided. A wide variety of suitable types of plates or laminations may be provided, such as any of the example plates illustrated and discussed above with reference to FIGS. 3-5. Additionally, any suitable number of plates or laminations may be provided. At block 610, the plurality of laminations or plates may be arranged into a stack. In other words, a laminated structure may be formed from the plurality of laminations. Alternatively, a unitary laminated structure may be provided. Regardless of its construction, the laminated structure may include a plurality of slots into which windings or other conductive elements may be positioned.

At block 615, an insulation coating or insulation layer may be formed on the laminated structure or stack. The insulation layer may be formed on any desired portion of the laminated structure. For example, at block 620, the insulation layer may be formed on an entire outer periphery of the laminated structure or an entire surface of the laminated structure (e.g., an inner surface, an outer surface). As another example, at block 625, the insulation layer may be selectively formed within a plurality of slots defined by the laminated structure into which windings may be positioned. A wide variety of suitable methods or techniques may be utilized as desired to form the insulation layer, such as spray coating, dip coating, spin coating, foam roller application, brush application, and/or extrusion. As desired, the insulation layer may be cured following application of insulation material onto the laminated structure.

At block 630, which may be optional in certain embodiments, one or more additional layers of insulation may be formed on the laminated structure. In other words, the insulation layer may include a plurality of sublayers as described in greater detail above with reference to FIG. 5. In certain embodiments, one or more additional layers may be formed from the same or similar materials utilized to form a first sublayer of the insulation layer. For example, a plurality of PI layers may be formed. In other embodiments, at least two sublayers may be formed from different materials. For example, different sublayers may be formed from different thermoset materials, such as PI and polyamideimide. As another example, different types of materials may be utilized to form different layers. For example, an extruded thermoplastic layer or a vapor deposited conformal layer may be formed over one or more thermoset enamel layers.

At block 635, respective windings or conductive elements may be positioned within a plurality of slots defined by the laminated structure. According to an aspect of the disclosure, the insulation layer may be positioned between the windings or conductive elements and the base materials (e.g., electrical steel, etc.) utilized to form the laminated structure. At block 640, the laminated structure or stack may be incorporated into an electric machine. For example, the laminated structure may be incorporated into a stator assembly, rotor assembly, field component, or armature of an electric machine. The method may end following block 640.

With reference to FIG. 7, the example method 700 may begin at block 705. At block 705, a lamination or plate intended for use in an electrical machine component (e.g., a laminated structure, etc.) may be provided. A wide variety of suitable types of plates or laminations may be provided, such as any of the example plates illustrated and discussed above with reference to FIGS. 3-5. At block 710, an insulation coating or insulation layer may be formed on the plate. The insulation layer may be formed on any desired portion of the plate. For example, at block 715, the insulation layer may be formed on an entire outer periphery of the plate or an entire surface of the plate (e.g., an inner surface, an outer surface). As another example, at block 720, the insulation layer may be selectively formed within a plurality of slots defined by the plate into which windings may be positioned. A wide variety of suitable methods or techniques may be utilized as desired to form the insulation layer, such as spray coating, dip coating, spin coating, foam roller application, brush application, and/or extrusion. As desired, the insulation layer may be cured following application of insulation material onto the plate.

At block 725, which may be optional in certain embodiments, one or more additional layers of insulation may be formed on the plate. In other words, the insulation layer may include a plurality of sublayers as described in greater detail above with reference to FIG. 5. In certain embodiments, one or more additional layers may be formed from the same or similar materials utilized to form a first sublayer of the insulation layer. For example, a plurality of PI layers may be formed. In other embodiments, at least two sublayers may be formed from different materials. For example, different sublayers may be formed from different thermoset materials, such as PI and polyamideimide. As another example, different types of materials may be utilized to form different layers. For example, an extruded thermoplastic layer or a vapor deposited conformal layer may be formed over one or more thermoset enamel layers.

Any suitable number of plates or laminations may be provided as desired. At block 730, a determination may be made as to whether a desired number of plates or laminations have been provided. If it is determined at block 730 that a desired number of plates has not been provided, then operations may continue at block 705 and an additional lamination or plate may be provided. If, however, it is determined at block 730 that a desired number of plates has been provided, then operations may continue at block 735. At block 735, the plurality of laminations or plates may be arranged into a stack. In other words, a laminated structure may be formed from the plurality of laminations.

At block 740, respective windings or conductive elements may be positioned within a plurality of slots defined by the laminated structure. According to an aspect of the disclosure, the insulation layer may be positioned between the windings or conductive elements and the base materials (e.g., electrical steel, etc.) utilized to form the laminated structure. At block 745, the laminated structure or stack may be incorporated into an electric machine. For example, the laminated structure may be incorporated into a stator assembly, rotor assembly, field component, or armature of an electric machine. The method may end following block 745.

The operations described and shown in the methods 600, 700 of FIGS. 6 and 7 may be carried out or performed in any suitable order as desired in various embodiments. Additionally, in certain embodiments, at least a portion of the operations may be carried out in parallel. Furthermore, in certain embodiments, less than or more than the operations described in FIGS. 6 and 7 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An electric machine comprising:
an armature; and
a field component;
wherein at least one of the armature or the field component comprises:
  a plurality of conductive elements;
  a laminated structure comprising a plurality of slots into which the plurality of conductive elements are positioned; and
  a polymeric insulation layer formed directly on the laminated structure at least within the plurality of slots, the polymeric insulation layer comprising a filler dispersed in a base polyimide material, the filler comprising between 20 percent and 80 percent by weight of silica oxide and between 20 and 80 percent by weight of titanium oxide, wherein the polymeric insulation layer has a thermal index of 260° C. or greater.

2. The electric machine of claim 1, wherein the electric machine comprises a rotating electric machine and the armature comprises one of a rotor or a stator.

3. The electric machine of claim 1, wherein the polymeric insulation layer is formed on one of (i) an entire outer surface of the laminated structure or (ii) an entire inner surface of the laminated structure.

4. The electric machine of claim 1, wherein:
the laminated structure comprises a plurality of plates arranged in a stack, and
the polymeric insulation layer is formed on one of (i) an entire respective outer surface of each of the plurality of plates or (ii) an entire respective inner surface of each of the plurality of plates.

5. The electric machine of claim 1, wherein:
the laminated structure comprises a plurality of plates arranged in a stack, and
the polymeric insulation layer is formed on an entire respective outer periphery of each of the plurality of plates.

6. The electric machine of claim 1, wherein:
the insulation layer comprises first insulation; and
each of the plurality of conductive elements comprises second insulation formed from the same material as the first insulation.

7. An electric machine comprising:
an armature; and
a field component;
wherein at least one of the armature or the field component comprises:
  a plurality of conductive elements, each of the plurality of conductive elements comprising a respective conductor and insulation formed around the conductor,
  a laminated structure comprising a plurality of slots into which the plurality of conductive elements are positioned; and
  a polymeric insulation layer formed directly on the laminated structure at least within the plurality of slots, the polymeric insulation layer comprising a filler dispersed in a base polyimide material, wherein the polymeric insulation layer has a thermal index of 260° C. or greater.

8. The electric machine of claim 7, wherein the polymeric insulation layer comprises thermoset polyimide.

9. The electric machine of claim 7, wherein the filler comprises between 20 percent and 80 percent by weight of silica oxide and between 20 and 80 percent by weight of titanium oxide.

10. The electric machine of claim 7, wherein the electric machine comprises a rotating electric machine and the armature comprises one of a rotor or a stator.

11. The electric machine of claim 7, wherein the polymeric insulation layer is formed on one of (i) an entire outer surface of the laminated structure or (ii) an entire inner surface of the laminated structure.

12. The electric machine of claim 7, wherein:
the laminated structure comprises a plurality of plates arranged in a stack, and
the polymeric insulation layer is formed on one of (i) an entire respective outer surface of each of the plurality of plates or (ii) an entire respective inner surface of each of the plurality of plates.

13. The electric machine of claim 7, wherein:
the laminated structure comprises a plurality of plates arranged in a stack, and
the polymeric insulation layer is formed on an entire respective outer periphery of each of the plurality of plates.

14. An electric machine comprising:
an armature; and
a field component;
wherein at least one of the armature or the field component comprises:
  a plurality of conductive elements;
  a laminated structure comprising a plurality of slots into which the plurality of conductive elements are positioned; and
  a thermoset polymeric insulation layer formed directly on the laminated structure at least within the plurality of slots, the polymeric insulation layer having a thermal index of 260° C. or greater.

15. The electric machine of claim 14, wherein the polymeric insulation layer comprises thermoset polyimide.

16. The electric machine of claim 14, wherein the polymeric insulation layer comprising a filler dispersed in a base polyimide material, the filler comprising between 20 percent and 80 percent by weight of silica oxide and between 20 and 80 percent by weight of titanium oxide.

17. The electric machine of claim 14, wherein the polymeric insulation layer comprises one of polyimide, polyamideimide, polyester, polysulfone, polyphenylsulfone, polysulfide, polyphenylenesulfide, polyetherimide, or polyamide.

18. The electric machine of claim 14, wherein the electric machine comprises a rotating electric machine and the armature comprises one of a rotor or a stator.

19. The electric machine of claim 14, wherein the polymeric insulation layer is formed on one of (i) an entire outer surface of the laminated structure or (ii) an entire inner surface of the laminated structure.

20. The electric machine of claim 14, wherein:
the laminated structure comprises a plurality of plates arranged in a stack, and
the polymeric insulation layer is formed on one of (i) an entire respective outer surface of each of the plurality of plates or (ii) an entire respective inner surface of each of the plurality of plates.

21. The electric machine of claim 14, wherein:
the laminated structure comprises a plurality of plates arranged in a stack, and
the polymeric insulation layer is formed on an entire respective outer periphery of each of the plurality of plates.

22. The electric machine of claim 14, wherein:
each of the plurality of conductive elements comprising a respective conductor and insulation formed around the conductor, and
wherein the polymeric insulation layer formed on the laminated structure and the insulation formed around the conductor of each of the plurality of conductive elements comprise the same material.

* * * * *